United States Patent Office 2,791,588
Patented May 7, 1957

2,791,588

α:ω-BISQUINOLINIUM COMPOUNDS

Henry Oswald Jackson Collier, Michael David Potter, and Edwin Percival Taylor, Bethnal Green, London, England, assignors to Allen & Hanburys Limited, London, England, a British company No Drawing. Application February 2, 1954,
Serial No. 407,802

Claims priority, application Great Britain
February 20, 1953

9 Claims. (Cl. 260—286)

This invention relates to novel heterocyclic polymethylene bis-quaternary ammonium salts having valuable anti-bacterial and anti-fungal activity.

The novel compounds of the present invention are of the general formula:

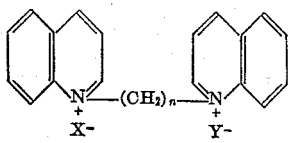

or of the general formula:

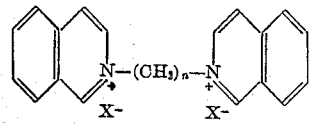

where $n$ is an integer of from 12 to 20 inclusive, and X is an anion.

While preferably X is a halogen its nature is not critical and it may, for example, be a perchlorate, a methosulphate or a nitrate ion.

The present invention also includes a process for the manufacture of the novel compounds wherein a polymethylene dihalide containing from 12 to 20 inclusive carbon atoms in the molecule is heated with quinoline or isoquinoline in an organic solvent.

The halides thus produced may be converted into other salts such as perchlorate, methosulphate or nitrate by double decomposition.

According to a preferred embodiment of the process of the invention the appropriate polymethylene dihalide is refluxed with an excess, for example a 50% excess, of quinoline or isoquinoline in benzene, alcohol or methyl ethyl ketone solution for 20 to 300 hours, the product being cooled, filtered and re-crystallised. In certain cases where the reaction is carried out in alcohol, it is necessary to add ether to the alcoholic reaction mixture in order to precipitate the crude quaternary salt.

The following examples illustrate the invention:

*Example I.—Preparation of tridecamethylene 1:13 bis-isoquinolinium diiodide*

1.09 gm. of tridecamethylene diiodide, 0.98 gm. of isoquinoline and 15 ml. of dry benzene were refluxed together on a steam bath for 120 hours and allowed to cool. A yellow oil, which solidified on standing, separated, and this was filtered off, washed with benzene, dried and re-crystallised from anhydrous industrial methylated spirit. The product consisted of yellow granules. M. Pt. 185–187° C.

*Example II.—Preparation of hexadecamethylene 1:16 bis-isoquinolinium diiodide*

0.5 gm. of hexadecamethylene diiodide, 0.4 gm. of isoquinoline and 8.0 ml. of anhydrous alcohol were refluxed together on a steam bath for 48 hours. A clear yellow solution was obtained; to this ether was added until the mixture was cloudy, the mixture was allowed to cool, filtered and the product re-crystallised from an alcohol-ether mixture. The product consisted of yellow nodules or rosettes of very small needles. M. Pt. 145.5 to 146.5° C.

*Example III.—Preparation of dodecamethylene 1:12 bis-isoquinolinium diiodide*

1.09 gm. of dodecamethylene diiodide, 1.0 gm. of isoquinoline and 15 ml. of dry benzene were refluxed together on a steam bath for 30 hours, and allowed to cool. The solid which separated was filtered off, washed with benzene, dried, and re-crystallised from a mixture of methyl and ethyl alcohols. The product consisted of yellow micro-crystals, melting point 206–207° C. (with decomposition).

*Example IV.—Preparation of tetradecamethylene 1:14 bis-isoquinolinium dibromide*

3.2 gms. of tetradecamethylene dibromide, 3.5 gms. of isoquinoline and 60 ml. of methyl ethyl ketone were refluxed together on a steam bath for 48 hours. The white solid which separated was filtered off, washed with methyl ethyl ketone, and re-crystallised from an alcohol-ether mixture. The product consisted of white nodules, melting point 163–165° C.

*Example V.—Preparation of tetradecamethylene 1:14 bis-isoquinolinium dimethosulphate*

10.0 gms. of tetradecamethylene 1:14 bis-isoquinolinium diiodide, and 6.0 ml. of dimethyl sulphate, were heated together at 100° C. for 15 minutes. 200 ml. of acetone was then added, and the mixture refluxed for 30 minutes. The white crystalline solid was filtered off, and re-crystallised from a mixture of ethyl alcohol and acetone. The product consisted of white prisms, melting point 224–225° C.

*Example VI.—Preparation of tetradecamethylene 1:14 bis-isoquinolinium dibromide*

A solution of 6.0 gms. of sodium bromide in 10 ml. of water was added to a solution of 1.0 gm. of tetradecamethylene 1:14 bis-isoquinolinium dimethosulphate in 20 ml. of water. A white precipitate separated immediately. This was filtered off, washed, dried and re-crystallised from an alcohol-ether mixture. The product was dissolved in the minimum quantity of methanol, 15 ml. of acetone added, and the solution concentrated to a small bulk. The product consisted of white crystals, melting point 164–165° C.

*Example VII.—Preparation of pentadecamethylene 1:15 bis-isoquinolinium diiodide*

1.2 gm. of pentadecamethylene diiodide, 1.0 gm. of isoquinoline, and 20 ml. of methyl ethyl ketone, were refluxed together on a steam bath for 24 hours, and allowed to cool. An oil which solidified on standing separated. This was filtered off, washed with methyl ethyl ketone, dried, and recrystallised from an alcohol-ether mixture. The product consisted of yellow nodules, melting point 145–146° C.

*Example VIII.—Preparation of heptadecamethylene 1:17 bis-isoquinolinium diiodide*

1.2 gm. of heptadecamethylene diiodide, 1.0 gm. of isoquinoline, and 20 ml. of methyl ethyl ketone, were refluxed together on a steam bath for 24 hours. The precipitated oil which crystallised on cooling, was filtered off, washed with methyl ethyl ketone, dried and re-crystallised from an acetone-ether mixture. The product consisted of yellow prisms, melting point 85–86° C.

*Example IX.—Preparation of octadecamethylene 1:18 bis-isoquinolinium diiodide*

2.53 gms. of octadecamethylene diiodide, 1.94 gms. of isoquinoline and 15 ml. of absolute alcohol, were refluxed together on a steam bath for 72 hours. A clear solution was obtained, to which ether was added until the mixture was cloudy. This was then allowed to cool, and the product recrystallised from an alcohol-ether mixture. The product was a yellow powder, melting point 138–140° C., after drying in vacuo at 100° C.

*Example X.—Preparation of nonadecamethylene 1:19 bis-isoquinolinium diiodide*

1.0 gm. of nonadecamethylene diiodide, 0.75 gm. of isoquinoline, and 15 ml. of methyl ethyl ketone, were refluxed together on a steam bath for 48 hours, and allowed to cool. An oil which crystallised an standing, separated. This was re-crystallised from an alcohol-ether mixture, discarding the trace of oily impurity which first separated. The product consisted of yellow needles, melting point 133–134° C.

*Example XI.—Preparation of eicosane 1:20 bis-isoquinolinium diiodide*

1.0 gm. of eicosane diiodide, 0.73 gm. of isoquinoline and 15 ml. of ethyl alcohol, were refluxed together on a steam bath for 120 hours, and cooled strongly. The solid which separated was re-crystallised from an alcohol-ether mixture. The product consisted of yellow needles, melting point 143.5–144.5° C.

*Example XII.—Preparation of dodecamethylene 1:12 bis-isoquinolinium diiodide*

1.5 gm. of dodecamethylene diiodide, 1.38 gm. of quinoline, and 15 ml. of methyl ethyl ketone, were refluxed together on a steam bath for 180 hours, and allowed to cool. An oil, which solidified on standing, separated. This was filtered off, washed with methyl ethyl ketone, dissolved in ethyl alcohol, the solution warmed with charcoal, and filtered. After concentration, ether was added to the filtrate. The product consisted of yellow needles, melting point on rapid heating, 157–159° C. On heating slowly, it sintered at 157–159° C. and melted at 186–188° C.

*Example XIII.—Preparation of tridecamethylene 1:13 bis-isoquinolinium diiodide*

1.0 gm. of tridecamethylene diiodide, 0.89 gm. of quinoline and 15 ml. of methyl ethyl ketone, were refluxed together on a steam bath for 180 hours. An oil, which solidified on standing, separated. This was filtered off, washed with methyl ethyl ketone, dissolved in ethyl alcohol, the solution warmed with charcoal, and filtered. After concentration, ether was added to the filtrate. The product separated as yellow granules, melting point 170° C.

*Example XIV.—Preparation of tetradecamethylene 1:14 bis-isoquinolinium diiodide*

1.0 gm. of tetradecamethylene diiodide, 0.86 gm. of quinoline, and 15 ml. of methyl ethyl ketone, were refluxed together on a steam bath for 300 hours, and allowed to cool. An oil separated, which solidified when cold. This was filtered off, washed with methyl ethyl ketone, dissolved in ethyl alcohol, warmed with charcoal, and filtered. After concentration, ether was added to the filterate. The product separated as yellow granules. Melting point 157–158° C.

*Example XV.—Preparation of hexadecamethylene 1:16 bis-isoquinolinium diiodide*

0.85 gm. of hexadecamethylene diiodide, 0.69 gm. of quinoline, and 15 ml. of methyl ethyl ketone, were refluxed together on a steam bath for 160 hours. An oil separated, which solidified on standing. This was filtered off, washed with methyl ethyl ketone, dissolved in ethyl alcohol, warmed with charcoal, and filtered. After concentration, ether was added to the filtrate. The product separated as yellow granules, melting point 148–150° C.

*Example XVI.—Preparation of octadecamethylene 1:18 bis-isoquinolinium diiodide*

0.8 gm. of octadecamethylene diiodide, 0.61 gm. of quinoline, and 15 ml. of methyl ethyl ketone, were refluxed together on a steam bath for 120 hours. An oil, which solidified on standing, separated. This was filtered off, washed with methyl ethyl ketone, dissolved in absolute alcohol, warmed with charcoal, and filtered. After concentration, ether was added to the filtrate. The product separated as yellow nodules or granules, melting point 157–158° C.

*Example XVII.—Preparation of eicosane 1:20 bis-quinolinium diiodide*

1.0 gm. of eicosane diiodide, 0.73 gm. of quinoline, and 15 ml. of methyl ethyl ketone, were refluxed together on a steam bath for 240 hours, and allowed to cool. A solid separated, which was filtered off, washed with methyl ethyl ketone, and dissolved in ethyl alcohol. The solution was warmed with charcoal, filtered and after concentration ether was added to the filtrate. The product consisted of yellow granules, melting point 160–161° C.

*Example XVIII.—Preparation of tetradecamethylene 1:14 bis-quinolinium dimethosulphate*

1.0 gm. of tetradecamethylene 1:14 bis-quinolinium diiodide, and 1.0 ml. of dimethyl sulphate, were heated together at 100° C. for 15 minutes. The resultant gum was refluxed with 30 ml. of acetone for one hour, and allowed to stand for 24 hours. The semi-solid product was dissolved in alcohol, warmed with charcoal, and filtered. After concentration, ether was added to the filtrate. The product consisted of tan coloured microcrystals, melting point 212–213° C.

*Example XIX.—Preparation of tetradecamethylene 1:14 bis-isoquinolinium dichloride*

10 gms. of sodium chloride was added to a solution of 2.0 gms. of tetradecamethylene 1:14 bis-isoquinolinium dimethosulphate in 60 ml. of water. The white precipitate was filtered off, re-dissolved in 60 ml. of water, and again precipitated with 10 gms. of sodium chloride. The precipitate was filtered off, and dried. The product was refluxed with acetone for one hour, filtered off, and re-crystallised from a mixture of alcohol, acetone and ether. The product consisted of white nodules, melting point 133–134° C.

*Example XX.—Preparation of tetradecamethylene 1:14 bis-isoquinolinium dinitrate*

20 gms. of tetradecamethylene 1:14 bis-isoquinolinium dimethosulphate was dissolved in 650 ml. of water, and 120 gms. of powered potassium nitrate added. The white crystalline precipitate was filtered off, dried, and re-crystallised from a mixture of absolute alcohol and ether. The product consisted of white needles, melting point 128–129° C.

*Example XXI.—Preparation of tridecamethylene 1:13 bis-isoquinolinium diperchlorate*

0.5 gm. of tridecamethylene 1:13 bis-isoquinolinium diiodide was dissolved in 10 ml. of warm alcohol, and 0.5 gm. of aqueous perchloric acid (60%) was added. An oil immediately separated, which on scratching, solidified to a pale yellow powder. This was re-crystallised from a methyl alcohol-ether mixture. The product consisted of a white micro-crystalline powder, melting point 128–129° C.

*Example XXII.—Preparation of tetradecamethylene 1:14-bis-isoquinolinium diiodide*

1.0 gm. of tetradecamethylene diiodide, 0.86 gm. of isoquinoline and 15 ml. of dry benzene were refluxed together on a steam bath for 48 hours, cooled, filtered, washed with benzene, dried and re-crystallised from alcohol. The product consisted of yellow granules, melting point 170–171° C.

TABLE I

*Activity in vitro of some polymethylene bis quinolinium diiodides against Staph. aureus and Trichophyton interdigitale*

| No. of methylene groups in chain | Mimimum inhibitory concentration in µg. per ml. ||
|---|---|---|
| | Staph. aureus (24 hours) | Trichophyton interdigitale (3 days) |
| 10 | 17.5 | 20 |
| 11 | | 10 |
| 12 | 1.49 | 5.0 |
| 13 | | 1.25 |
| 14 | 0.186 | 1.25 |
| 16 | 0.066 | 2.5 |
| 18 | 0.186 | 2.5 |
| 20 | 0.263 | 5.0 |

TABLE II

*Activity in vitro of some polymethylene bis isoquinolinium diiodides against Staph. aureus and Trichophyton interdigitale*

| No. of methylene groups in chain | Mimimum inhibitory concentration in µg. per ml. ||
|---|---|---|
| | Staph. aureus (24 hours) | Trichophyton interdigitale (3 days) |
| 10 | 1.26 | 10 |
| 11 | 0.32 | 5 |
| 12 | 0.20 | 2.5 |
| 13 | 0.25 | 1.25 |
| 14 | 0.125 | 0.625 |
| 15 | | 0.625 |
| 16 | 0.063 | 1.25 |
| 17 | | 2.5 |
| 18 | 0.035 | 1.25 |
| 19 | | 2.5 |
| 20 | 0.39 | 5 |

TABLE III

*Activity in vitro of some polymethylene bis quinolinium and isoquinolinium salts against various microbial species*

| | Minimum inhibitory concentration in µg. per ml., after 3 days ||||
|---|---|---|---|---|
| | Tetradecamethylene 1:14 bis quinolinium diiodide | Tetradecamethylene 1:14 bis isoquinolinium diiodide | Hexadecamethylene 1:16 bis quinolinium diiodide | Hexadecamethylene 1:16 bis isoquinolinium diiodide |
| Candida albicans | 10 | 10 | 1.25 | 1.25 |
| Microsporon audouini | 1.25 | 1.25 | 0.3125 | 0.625 |
| Microsporon canis | 1.25 | 0.265 | 0.625 | 1.25 |
| Microsporon gypseum | 2.5 | 5 | 1.25 | 2.5 |
| Trichophyton interdigitale | 1.25 | 1.25 | 1.25 | 2.5 |
| Trichophyton mentagrophytes | 5 | 2.5 | 1.25 | 2.5 |
| Trichophyton rubrum | 1.25 | 1.25 | 0.3125 | 1.25 |

TABLE IV

*Activity in vitro of some polymethylene bis quinolinium and isoquinolinium salts against Staph. aureus and Trichophyton interdigitale*

| | Minimum inhibitory concentration in µg. per ml. ||
|---|---|---|
| | Staph. aureus (24 hours) | Trichophyton interdigitale (3 days) |
| Tetradecamethylene 1:14 bis quinolinium diiodide | 0.156 | 1.25 |
| Tetradecamethylene 1:14 bis quinolinium dimethosulphate | 0.072 | 1.25 |
| Tetradecamethylene 1:14 bis isoquinolinium diiodide | 0.312 | 2.5 |
| Tetradecamethylene 1:14 bis isoquinolinium dichloride | 0.156 | 0.625 |
| Tetradecamethylene 1:14 bis isoquinolinium dinitrate | 0.312 | 1.25 |
| Tetradecamethylene 1:14 bis isoquinolinium dimethosulphate | 0.156 | 2.5 |
| Tetradecamethylene 1:14 bis isoquinolinium dibromide | 0.156 | 2.5 |

We claim:

1. Novel nitrogen-containing heterocyclic compounds selected from the group consisting of compounds of the general formula:

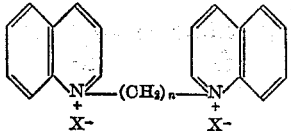

and compounds of the general formula:

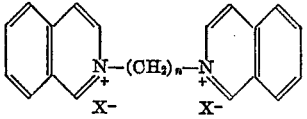

where $n$ is an integer of from 12 to 20 inclusive and X is an anion.

2. Tetradecamethylene 1:14 bis-isoquinolinium dimethosulphate.

3. Hexadecamethylene 1:16 bis-isoquinolinium diiodide.

4. Tetradecamethylene-1:14-bis-quinolinium diiodide.

5. Tetradecamethylene - 1:14-bis-quinolinium dimethosulphate.

6. Tetradecamethylene - 1:14-bis-isoquinolinium dichloride.

7. A process for the manufacture of nitrogen-containing heterocyclic compounds selected from the group consisting of compounds of the general formula:

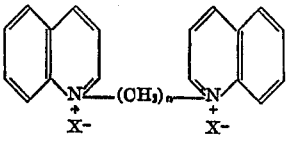

and compounds of the general formula:

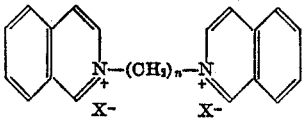

where $n$ is an integer of from 12 to 20 inclusive and X is an anion, which comprises heating a polymethylene dihalide containing from 12 to 20 inclusive carbon atoms in the molecule with a heterocyclic nitrogen base selected from the group consisting of quinoline and isoquinoline in an organic solvent.

8. A process of the manufacture of nitrogen-containing heterocyclic compounds selected from the group consisting of compounds of the general formula:

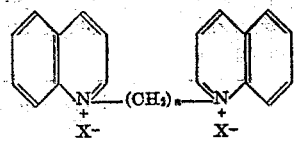

and compounds of the general formula:

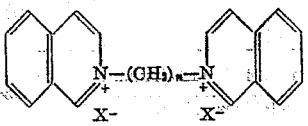

where $n$ is an integer of from 12 to 20 inclusive and X is an anion which comprises heating a polymethylene dihalide containing from 12 to 20 inclusive carbon atoms in the molecule with a heterocyclic nitrogen base selected from the group consisting of quinoline and isoquinoline in an organic solvent and then converting the halide obtained into another salt by double decomposition.

9. A process for the manufacture of nitrogen-containing heterocyclic compounds selected from the group consisting of compounds of the general formula:

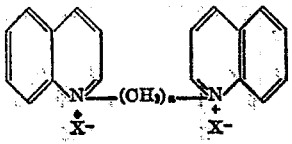

and compounds of the general formula:

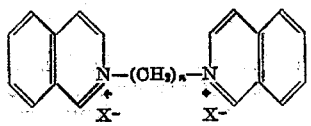

where $n$ is an integer of from 12 to 20 inclusive and X is an anion which comprises heating a polymethylene dihalide containing from 12 to 20 inclusive carbon atoms in the molecule with an excess of a heterocyclic nitrogen base selected from the group consisting of quinoline and isoquinoline in an organic solvent selected from the group consisting of benzene, alcohol and methyl ethyl ketone for 20 to 300 hours.

References Cited in the file of this patent

Barlow et al.: Nature, vol. 161, p. 718 (1948).
Barlow et al.: Brit. J. Pharmacol, vol. 3, pp. 298–304 (1948).
Hartwell et al.: J. Am. Chem. Soc., vol. 72, pp. 2040–44 (1950).
British J. Pharmacol, v. 8, pp. 34–7 (1953).